US008717587B2

(12) United States Patent
Kano

(10) Patent No.: US 8,717,587 B2
(45) Date of Patent: May 6, 2014

(54) IMAGE PROCESSING APPARATUS, CONTROL METHOD, AND COMPUTER-READABLE STORAGE MEDIUM FOR COMPUTER PROGRAM

(75) Inventor: Takahiro Kano, Toyonaka (JP)

(73) Assignee: Konica Minolta Business Technologies Inc., Chiyoda-Ku, Tokyo (JP)

( * ) Notice: Subject to any disclaimer, the term of this patent is extended or adjusted under 35 U.S.C. 154(b) by 240 days.

(21) Appl. No.: 13/280,943

(22) Filed: Oct. 25, 2011

(65) Prior Publication Data
US 2012/0105909 A1    May 3, 2012

(30) Foreign Application Priority Data

Nov. 1, 2010    (JP) ................................. 2010-244976

(51) Int. Cl.
*G06F 3/12* (2006.01)

(52) U.S. Cl.
USPC .......... 358/1.13; 358/1.14; 358/1.15; 399/87; 709/203; 709/219; 709/228; 709/229

(58) Field of Classification Search
USPC .............. 358/1.13, 1.14, 1.15, 443, 448, 468; 399/10, 11, 18, 19, 46, 76, 82, 85, 87; 709/203, 218, 219, 228, 229
See application file for complete search history.

(56) References Cited

U.S. PATENT DOCUMENTS

| | | |
|---|---|---|
| 2001/0029521 A1 | 10/2001 | Matsuda et al. |
| 2003/0214678 A1 | 11/2003 | Shibata et al. |
| 2006/0087682 A1 | 4/2006 | Lee |
| 2008/0046574 A1 | 2/2008 | Kinoshita et al. |

FOREIGN PATENT DOCUMENTS

| | | |
|---|---|---|
| CN | 1317768 A | 10/2001 |
| CN | 1461139 A | 12/2003 |
| CN | 1766827 A | 5/2006 |
| JP | 2005-038096 A | 2/2005 |
| JP | 2005-165658 A | 6/2005 |
| JP | 2008-015593 A | 1/2008 |

OTHER PUBLICATIONS

Office Action (Decision to Grant a Patent) dated Oct. 23, 2012, issued in corresponding Japanese Patent Application No. 2010-244976, and an English Translation thereof (6 pages).

Official Action issued by the State Intellectual Property Office of the People's Republic of China on Jan. 3, 2014 in Chinese Application No. 201110339573.3 and English language translation of Official Action (23 PGS).

*Primary Examiner* — Vu B Hang

(74) *Attorney, Agent, or Firm* — Buchanan Ingersoll & Rooney PC

(57) ABSTRACT

An image processing apparatus includes an execution portion configured to execute a job, a providing portion configured to provide a Web page in response to a request, a determination portion configured to determine a time-out period, which is a period during which a response from the providing portion to the request is acceptable, depending on conditions of a job that is being executed by the execution portion and conditions of a job that waits to be executed by the execution portion, and a management portion configured to manage execution of a process by the execution portion and a process by the providing portion in such a manner that the former is executed before the latter.

12 Claims, 10 Drawing Sheets

| JL1 | JL2 | JL3 | JL4 |

| REGISTRATION NUMBER | JOB TYPE | JOB DETAILED INFORMATION | EXECUTION STATE |
|---|---|---|---|
| 1 | SCAN JOB | RESOLUTION, ETC. | RUN |

FIG. 4B

| JL1 | JL2 | JL3 | JL4 |
|---|---|---|---|
| REGISTRATION NUMBER | JOB TYPE | JOB DETAILED INFORMATION | EXECUTION STATE |
| 1 | SCAN JOB | RESOLUTION, ETC. | RUN |
| 2 | PRINT JOB | SIZE OF PRINT DATA, ETC | READY |

| JL1 | JL2 | JL3 | JL4 |
|---|---|---|---|
| REGISTRATION NUMBER | JOB TYPE | JOB DETAILED INFORMATION | EXECUTION STATE |
| 1 | SCAN JOB | RESOLUTION, ETC. | RUN |
| 2 | PRINT JOB | SIZE OF PRINT DATA, ETC | RUN |
| 3 | FAX RECEPTION JOB | SIZE OF RECEIVED DATA, ETC. | READY |
| 4 | SCAN JOB | RESOLUTION, ETC. | READY |
| 5 | PRINT JOB | SIZE OF PRINT DATA, ETC | READY |

FIG. 5

| DT | | | |
|---|---|---|---|
| DT1 | REFERENCE TIME-OUT PERIOD | | VALUE |
| dt11 | STANDARD TIME-OUT PERIOD | | 20sec |
| dt12 | ALLOWABLE TIME-OUT PERIOD | | 180sec |
| DT2 | JOB EXECUTION ADDITIONAL TIME | | VALUE |
| dt21 | SCAN JOB EXECUTION ADDITIONAL TIME | RESOLUTION EQUAL TO OR GREATER THAN 400 dpi AND SMALLER THAN 600 dpi | +40sec |
| | | RESOLUTION EQUAL TO OR GREATER THAN 600 dpi AND SMALLER THAN 1200 dpi | +100sec |
| | | RESOLUTION EQUAL TO OR GREATER THAN 1200 dpi | +160sec |
| dt22 | PRINT JOB EXECUTION ADDITIONAL TIME | PRINT DATA SIZE EQUAL TO OR GREATER THAN 10 MB IN TOTAL | +20sec |
| | | TYPE OF PRINT DATA IS IMAGE DATA | +20sec |
| dt23 | FAX RECEPTION JOB EXECUTION ADDITIONAL TIME | RECEIVED DATA SIZE EQUAL TO OR GREATER THAN 10 MB IN TOTAL | +20sec |
| | | AT LEAST TWO SETS OF RECEIVED DATA RECEIVABLE AT ONE TIME | +40sec |
| DT3 | JOB STANDBY ADDITIONAL TIME | | VALUE |
| dt31 | SCAN JOB STANDBY ADDITIONAL TIME | RESOLUTION EQUAL TO OR GREATER THAN 400 dpi AND SMALLER THAN 600 dpi | +40sec |
| | | RESOLUTION EQUAL TO OR GREATER THAN 600 dpi AND SMALLER THAN 1200 dpi | +100sec |
| | | RESOLUTION EQUAL TO OR GREATER THAN 1200 dpi | +160sec |
| dt32 | PRINT JOB STANDBY ADDITIONAL TIME | PRINT DATA SIZE EQUAL TO OR GREATER THAN 10 MB IN TOTAL | +20sec |
| | | TYPE OF PRINT DATA IS IMAGE DATA | +20sec |
| dt33 | FAX RECEPTION JOB STANDBY TIME | RECEIVED DATA SIZE EQUAL TO OR GREATER THAN 10 MB IN TOTAL | +20sec |
| | | AT LEAST TWO SETS OF RECEIVED DATA RECEIVABLE AT ONE TIME | +40sec |

IMAGE PROCESSING APPARATUS, CONTROL METHOD, AND COMPUTER-READABLE STORAGE MEDIUM FOR COMPUTER PROGRAM

This application is based on Japanese patent application No. 2010-244976 filed on Nov. 1, 2010, the contents of which are hereby incorporated by reference.

BACKGROUND OF THE INVENTION

1. Field of the Invention

The present invention relates to an image processing apparatus having a Web page providing portion, a control method therefor, and so on.

2. Description of the Related Art

Image processing apparatuses having a variety of functions, such as copying, network printing (PC printing), scanning, faxing, and document server, have recently attained widespread use. Such image processing apparatuses are called "multifunction devices", "Multi-Function Peripherals (MFPs)", or the like.

In recent years, some image processing apparatuses have been provided with a Web server and a Web browser.

The Web server and the Web browser are configured to work in coordination with each other, and thereby, a user interface of the image processing apparatus is provided. This enables flexible configuration of the user interface having different specifications on a client-by-client basis, and enables cost reduction in user interface development.

Incidentally, a Web browser is generally configured to display a time-out error for a case where the Web browser requests a Web page from a Web server, and no response is received from the Web server until a predetermined amount of time has elapsed since the Web browser made the request. Hereinafter, the predetermined amount of time is called a "time-out period".

When a preset time-out period is long, the Web browser has to wait for a response from the Web server for a long period of time. On the other hand, when the preset time-out period is short, the Web browser displays time-out errors many times. Accordingly, adjusting the length of a time-out period is important in the light of configuration of a good user interface.

In general, the time-out period is fixed at a predetermined length. However, a technique has been proposed in which the time-out period is adjusted depending on a load imposed on a Web server (see Document 1, i.e., Japanese Laid-open Patent Publication No. 2005-165658).

As described in Document 1, an adjustment is so made that the time-out period has a length of time depending on a load on the Web server. Thereby, time-out errors are probably less likely to be displayed, and a client terminal does not have to wait for a response from the Web server for a long period of time.

However, if the method described in Document 1 is applied to an image processing apparatus, the foregoing advantage is not always obtained.

To be specific, it is sometimes a case where, even when a Web server provided in the image processing apparatus is not so overloaded, a Web browser displays a time-out error because no response is received from the Web server by the end of the time-out period, and an appropriate time-out period is not set in the image processing apparatus.

SUMMARY

The present disclosure is directed to solve the problems pointed out above, and therefore, an object of an embodiment of the present invention is to provide an image processing apparatus which has a Web server function and in which an appropriate time-out period is set for a Web browser.

According to an aspect of the present invention, an image processing apparatus includes an execution portion configured to execute a job, a providing portion configured to provide a Web page in response to a request from a request source, a determination portion configured to determine a time-out period depending on conditions of a job that is being executed by the execution portion and conditions of a job that waits to be executed by the execution portion, the time-out period being a period during which a response from the providing portion to the request is acceptable, and a management portion configured to manage execution of a process by the execution portion and a process by the providing portion in such a manner that the process by the execution portion is executed before the process by the providing portion.

These and other characteristics and objects of the present invention will become more apparent by the following descriptions of preferred embodiments with reference to drawings.

BRIEF DESCRIPTION OF THE DRAWINGS

FIGS. 4A to 4C are diagrams showing examples of a job list.

FIG. 5 is a diagram showing an example of a time-out period determination table.

DESCRIPTION OF THE PREFERRED EMBODIMENTS

Figure 1:
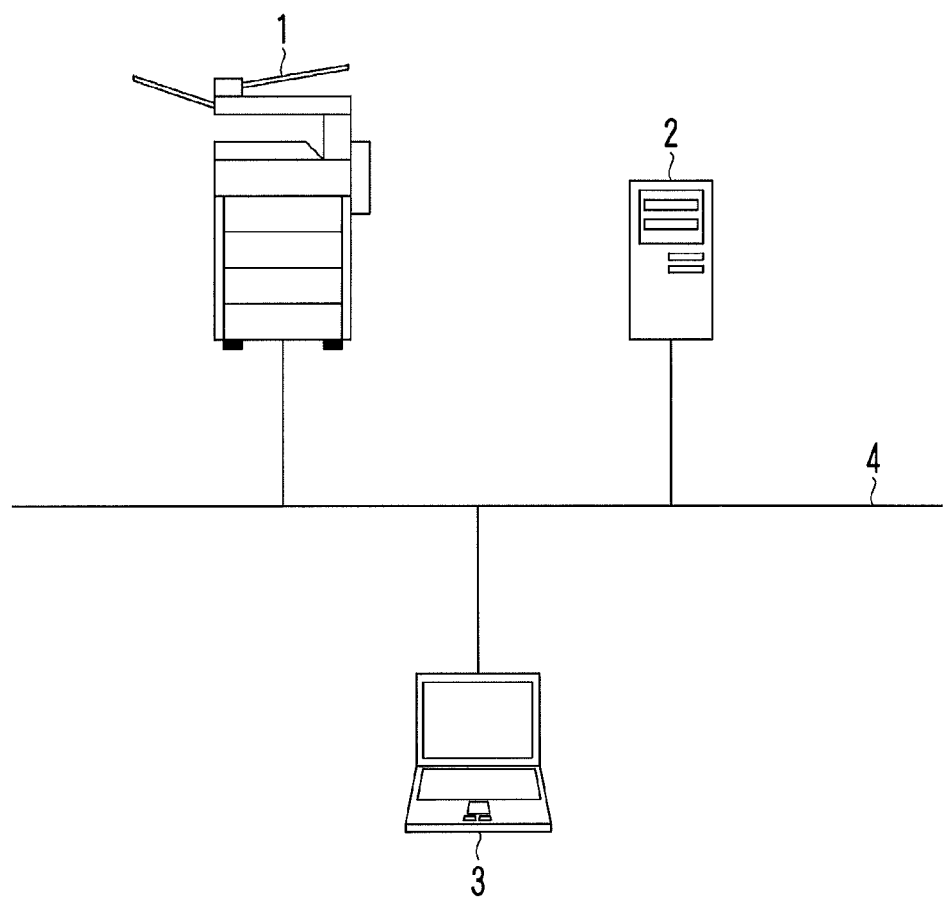
FIG. 1 is a diagram showing an example of the configuration of a network system.

FIG. 1 is a diagram showing an example of the configuration of a network system SY.

Referring to FIG. 1, the network system SY is configured of an image processing apparatus 1, a Web server machine 2, a user terminal 3, and non-illustrated other information processing devices, all of which are connected to a network 4.

The image processing apparatus 1 is an information processing device that integrates a variety of functions, such as copying, network printing (PC printing), scanning, faxing, and document server, into a single unit. The image processing apparatus 1 is sometimes called a "multifunction device" or an "MFP", for example.

The Web server machine 2 is an information processing device that provides a Web page to a Web browser of an information processing device connected to the network 4 and to a Web browser of an information processing device connected to the Internet in response to a request therefrom.

The user terminal 3 is an information processing device used by a user for daily business. The user terminal 3 is, for example, a personal computer. The user can use the user terminal 3 to give the image processing apparatus 1a print job, and to operate the image processing apparatus 1 via the network 4.

The network 4 is a communication line for enabling communication between information processing devices connected thereto, namely, a so-called Local Area Network (LAN). The network 4 is sometimes connected to the Internet via a gateway, or the like.

Figure 2:
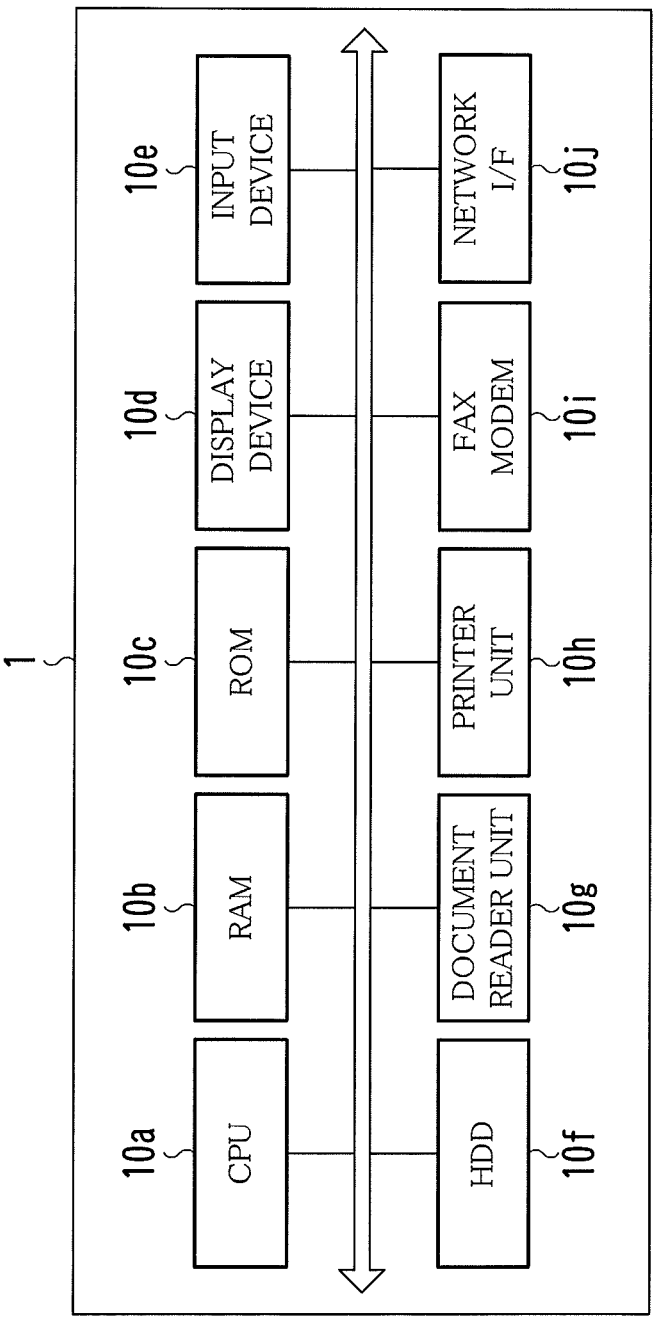
FIG. 2 is a diagram showing an example of the hardware configuration of an image processing apparatus.

FIG. 2 is a diagram showing an example of the hardware configuration of the image processing apparatus 1.

Referring to FIG. 2, the image processing apparatus 1 is configured of a Central Processing Unit (CPU) 10a, a Random Access Memory (RAM) 10b, a Read Only Memory (ROM) 10c, a display device 10d, an input device 10e, a Hard Disk Drive (HDD) 10f, a document reader unit 10g, a printer unit 10h, a FAX modem 10i, a network Interface (I/F) 10j, and so on. In addition to them, the image processing apparatus 1 is sometimes provided with a control circuit for controlling operation timing of the individual units.

The CPU 10a executes operation processing using the RAM 10b as a work area based on programs and data stored in the ROM 10c or the HDD 10f, and a variety of data sets externally entered as required.

The display device 10d is implemented by a liquid crystal display or a CRT display, and is operable to display a variety of screens for a user. Such screens are displayed on the display in accordance with instructions from the CPU 10a. The screens are, for example, a screen for operation guidance, a screen for informing a user of a job execution state, and a screen for the user to confirm data saved to the HDD 10f.

The input device 10e is provided with a numeric keypad and various operation buttons, and is operable to receive operation performed by a user. When the user operates the numeric keypad or the operation buttons, a command corresponding to the user operation is issued to the CPU 10a. For example, a command to execute a job is issued to the CPU 10a.

Both the display device 10d and the input device 10e may be implemented by a single touch-sensitive panel.

The HDD 10f is a non-volatile magnetic storage device for retaining data stored therein even when no power is supplied. Instead of the HDD 10f, a semiconductor memory such as a flash memory or a Non volatile Random Access Memory (NVRAM) may be used.

The document reader unit 10g is provided with a light source, an image sensor, and so on. The document reader unit 10g is a device that optically captures an image such as a character and a chart depicted on paper to create image data thereof.

The printer unit 10h is implemented by using an electrophotographic print mechanism, an inkjet print mechanism, or a thermal transfer print mechanism. The printer unit 10h serves to print an image onto paper based on data saved to the HDD 10f, data generated by the document reader unit 10g, data received from an information processing device connected to the network 4, or the like.

The FAX modem 10i serves to send and receive data with other FAX machines via a public line based on a FAX protocol such as G3.

The network I/F 10j serves to send and receive data with other information processing devices according to Transmission Control Protocol/Internet Protocol (TCP/IP) via the network 4. An example of the network I/F 10j is a Network Interface Card (NIC).

Figure 3:
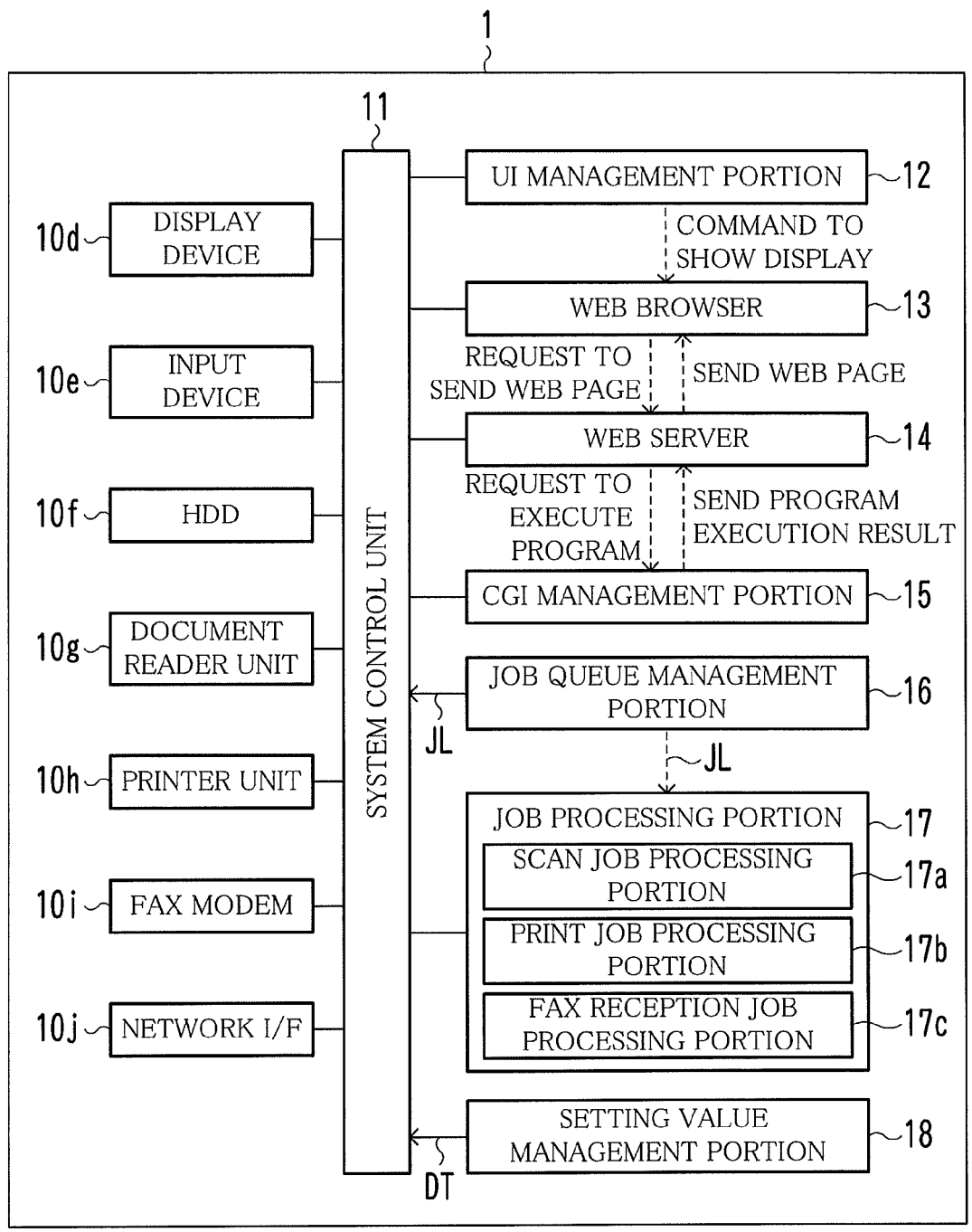
FIG. 3 is a diagram showing an example of the functional configuration of an image processing apparatus.
Figure 6:
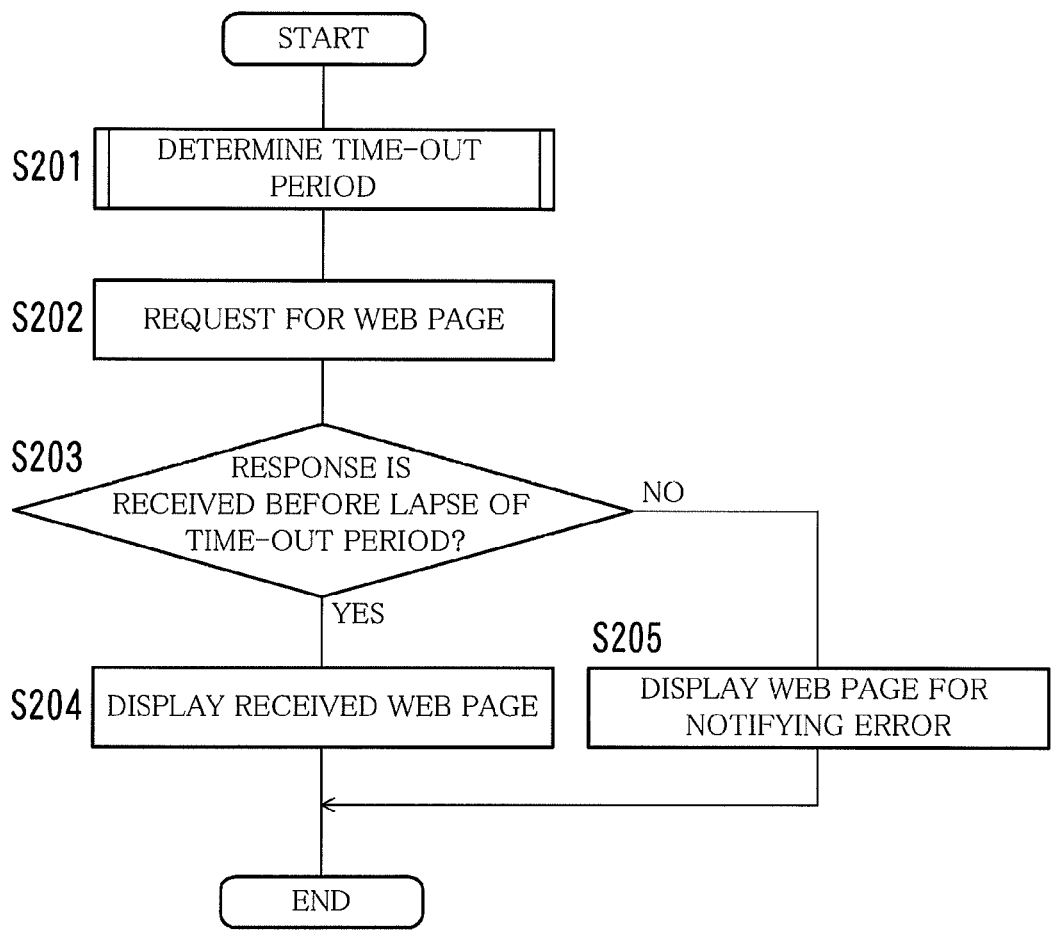
FIG. 6 is a flowchart depicting an example of processes carried out when a Web page is displayed.
Figure 7:
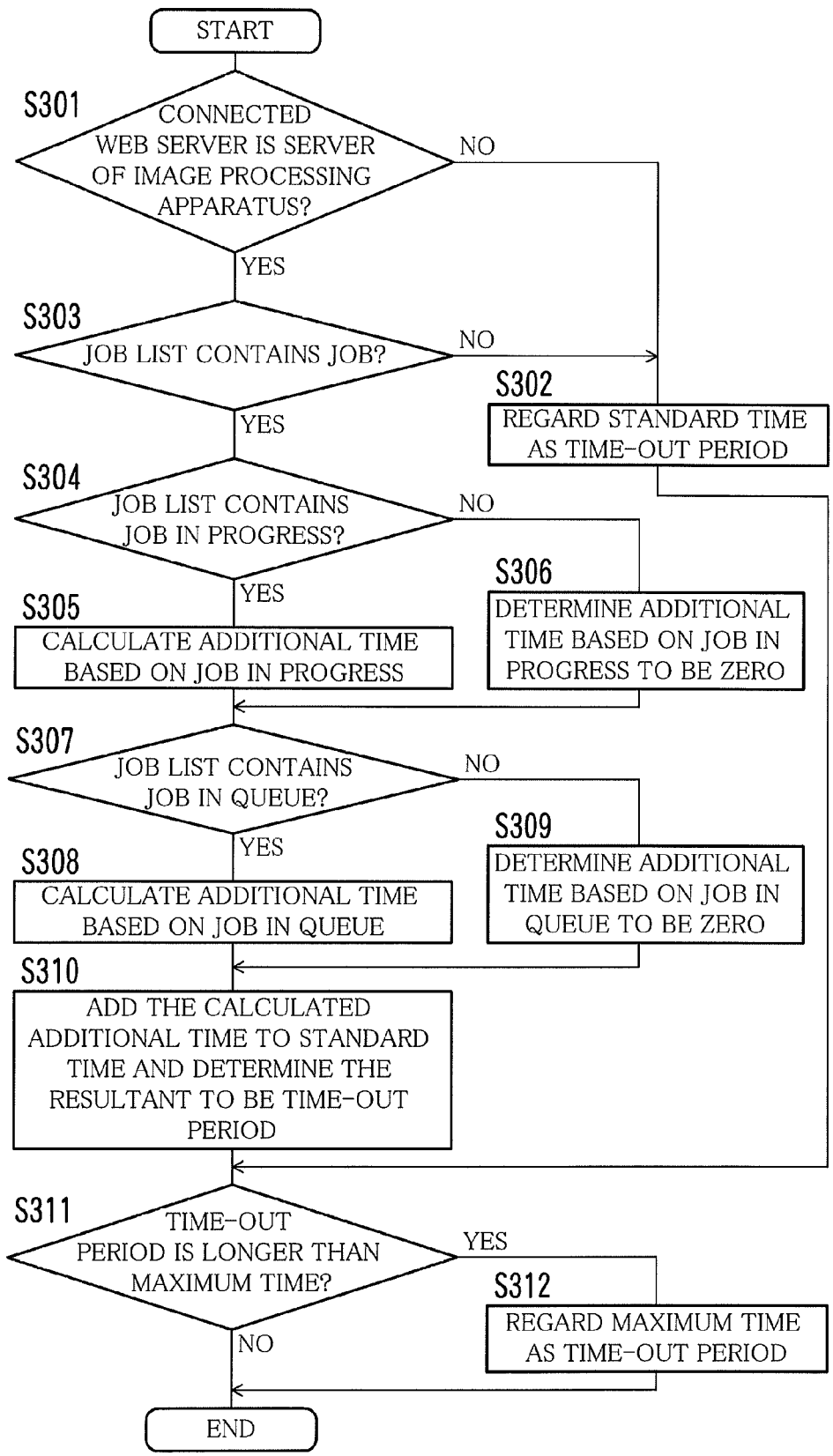
FIG. 7 is a flowchart depicting an example of process steps carried out when the length of a time-out period is determined.
Figure 8:
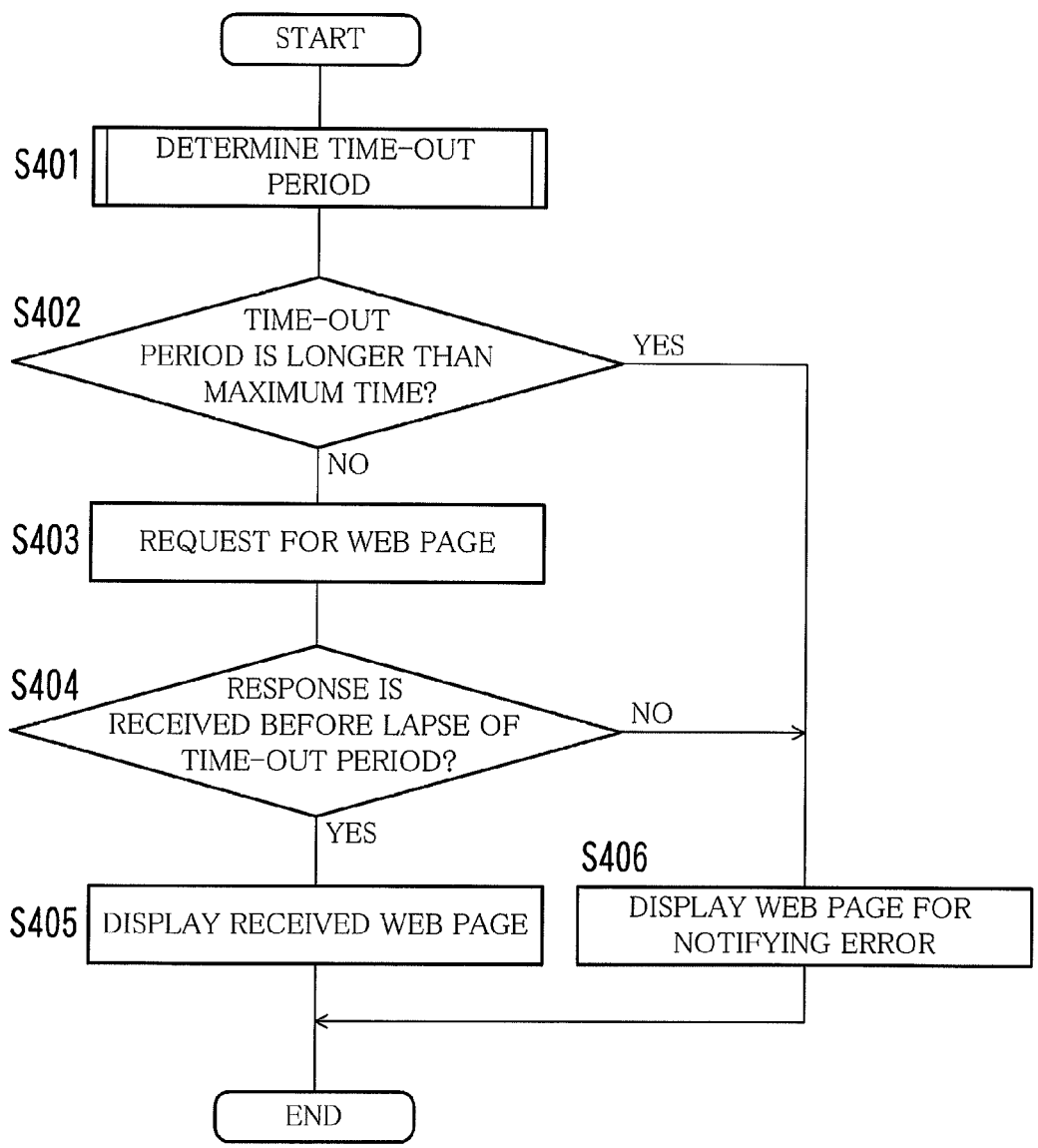
FIG. 8 is a flowchart depicting an example of processes carried out when a Web page is displayed.

FIG. 3 is a diagram showing an example of the functional configuration of the image processing apparatus 1; FIGS. 4A to 4C are diagrams showing examples of a job list JL; FIG. 5 is a diagram showing an example of a time-out period determination table DT; FIGS. 6 and 8 are flowcharts depicting an example of processes carried out when a Web page is displayed; and FIG. 7 is a flowchart depicting an example of processing steps carried out when the length of a time-out period is determined.

Referring to FIG. 3, the image processing apparatus 1 is configured of functional portions such as a system control unit 11, a UI management portion 12, a Web browser 13, a Web server 14, a CGI management portion 15, a job queue management portion 16, a job processing portion 17, and a setting value management portion 18. The job processing portion 17 is configured of a scan job processing portion 17a, a print job processing portion 17b, a FAX reception job processing portion 17c, and so on. The ROM 10c or the HDD 10f stores, therein, programs for implementing the functions of the functional portions 11-18. The CPU 10a executes the programs appropriately.

The system control unit 11 centrally controls the operation of the individual functional portions 12-18 and of the individual units 10d-10j. In particular, according to this embodiment, the system control unit 11 organizes, for each predetermined unit, processes by the individual functional portions 12-18 and manages the resultant as tasks to be executed by the image processing apparatus 1. Each of the tasks is given a task priority level indicating a priority level for execution. For example, the task priority is given, in order from the highest priority level down, to a task corresponding to the job processing portion 17, a task corresponding to the Web browser 13, and a task corresponding to the Web server 14.

The system control unit 11 executes generated tasks in accordance with the task priority and also in parallel with one another. In short, the system control unit 11 implements multitasking. However, a task given a lower task priority level is assigned a task execution time shorter than that assigned to a task given a higher task priority level. Alternatively, such a task given a lower task priority level is pending until a task given a higher task priority level is completely executed. For example, while a task which corresponds to the job processing portion 17 and to which a higher task priority level is given is executed, a task which corresponds to the Web server 14 and to which a lower task priority level is given is not processed sufficiently or not processed at all. Stated differently, once the image processing apparatus 1 is given a job, processing for executing the job takes precedence over any other processing, resulting in a reduction in performance of the Web server 14. In short, the processing power of the Web server 14 depends not only on the load conditions thereof but also on the load conditions of the entire image processing apparatus 1, particularly, on the conditions of jobs in progress by the image processing apparatus 1.

The system control unit 11 receives, through the input device 10e, a variety of jobs such as a job to capture a document image (scan job), a job to print an image onto paper (print job), and a job to capture a document image to print the captured image (copy job). The system control unit 11 also receives, through the FAX modem 10i, a job to receive FAX data (FAX reception job). The system control unit 11 also receives, through the network I/F 10j, a print job.

The job queue management portion 16 registers jobs received by the system control unit 11 in the job list JL (see FIGS. 4A to 4C) in the order that the jobs were received. In other words, the job queue management portion 16 adds records to the job list JL.

As shown in FIGS. 4A to 4C, the job list JL contains information such as a registration number JL1, a job type JL2, job detailed information JL3, and an execution state JL4. Such information is set in each registered job.

When the system control unit 11 receives a new job, the job queue management portion 16 adds a new record for the new job to the job list JL, and sets appropriate values in the registration number JL1, the job type JL2, the job detailed information JL3, and the execution state JL4. The registration number JL1 is a value indicating the order in which the job was registered. The job type JL2 is a value indicating the type of the job. The job detailed information JL3 is a value indicating the detailed information of the job such as an execution mode of the job or a data size relating to the job. The execution state JL4 is a value indicating that the job is in queue, i.e., the job is ready for execution. In the illustrated example of FIGS. 4B and 4C, the value "READY" is set in the execution state JL4.

The job processing portion 17 executes jobs registered in the job list JL in order from one having the smallest number in the registration number JL1, i.e., in the order that the jobs were registered in the job list JL. At this time, the job processing portion 17 sometimes executes the jobs in parallel with one another.

The scan job processing portion 17a of the job processing portion 17 executes a job having a value indicating a scan job in the job type JL2 of the job list JL.

The print job processing portion 17b of the job processing portion 17 executes a job having a value indicating a print job in the job type JL2 of the job list JL.

The FAX reception job processing portion 17c of the job processing portion 17 executes a job having a value indicating a FAX reception job in the job type JL2 of the job list JL.

As soon as the job processing portion 17 starts executing a job, the job queue management portion 16 sets, in the execution state JL4 of a record corresponding to the job, a value indicating that the job is in progress, i.e., the value "RUN", in examples of FIGS. 4A to 4C. As soon as the job processing portion 17 finishes executing the job completely, the job queue management portion 16 deletes the record corresponding to the job from the job list JL, and advances, by one, each value set in the registration number JL1 of the succeeding records.

As described above, the job queue management portion 16 performs, in the job list JL, queue management of jobs to be executed by the image processing apparatus 1.

FIG. 4A shows an example in which one job is registered in the job list JL and the job is in progress.

FIG. 4B shows an example in which two jobs are registered in the job list JL, and the first-registered job is in progress and the second-registered job waits to be executed.

FIG. 4C shows an example in which five jobs are registered in the job list JL and the first-registered and second-registered jobs are in progress, and the third-registered through fifth-registered jobs wait to be executed.

The system control unit 11 determines which screen is to be displayed on the display device 10d in accordance with a command given by the user through the input device 10e or the like, and the operating conditions of the image processing apparatus 1. The system control unit 11, then, instructs the UI management portion 12 to display the screen thus determined on the display device 10d.

The UI management portion 12 manages the details of screens to be displayed on the display device 10d. The UI management portion 12 instructs the Web browser 13 to obtain a Web page corresponding to the screen designated by the system control unit 11, and to display the details of the Web page obtained on the display device 10d.

Referring to FIG. 6, when being instructed to display the Web page from the UI management portion 12, the Web browser 13 requests a Web server (the Web server 14 or an external Web server) to provide the corresponding Web page (Step S202). Prior to this, the system control unit 11 determines a time-out period ET that is a period during which the Web browser 13 can wait for a response to the request for a Web page from a time when the Web browser 13 made the request (Step S201). As described later, the Web browser 13 stops waiting for the response at a time when the time-out period ET has passed since the Web browser 13 made the request, and displays a Web page for informing the user of the time-out error.

The system control unit 11 determines a time-out period ET based on the job list JL (see FIGS. 4A to 4C) managed by the job queue management portion 16, and the time-out period determination table DT (see FIG. 5) managed by the setting value management portion 18.

The setting value management portion 18 manages, in the HDD 10f or the like, the time-out period determination table DT shown in FIG. 5.

Referring to FIG. 5, the time-out period determination table DT contains a reference time-out period DT1 serving as the reference for determination of a time-out period ET. The reference time-out period DT1 includes a standard time-out period dt11 that is a standard length of time as the time-out period ET, and an allowable time-out period dt12 that shows the maximum length of time as the time-out period ET. The standard time-out period dt11 and the allowable time-out period dt12 are assigned values individually.

The time-out period determination table DT also contains a job execution additional time DT2 whose value is to be added to the value of the standard time-out period dt11 depending on a load due to a job in progress.

Referring to FIG. 5, the job execution additional time DT2 includes a scan job execution additional time dt21 for a scan job in progress, a print job execution additional time dt22 for a print job in progress, and a FAX reception job execution additional time dt23 for a FAX reception job in progress. The scan job execution additional time dt21, the print job execution additional time dt22, and the FAX reception job execution additional time dt23 are assigned values individually.

The scan job execution additional time dt21 is classified into levels based on a scanning resolution of a document for a scan job, and a length of time is preset in each of the levels. The specific examples of the scan job execution additional time dt21 are as follows: The value "40 seconds" is preset for the scanning resolution equal to or greater than 400 dpi and smaller than 600 dpi; the value "100 seconds" is preset for the scanning resolution equal to or greater than 600 dpi and smaller than 1200 dpi; and the value "160 seconds" is preset for the scanning resolution equal to or greater than 1200 dpi. Since no value is registered, as the scan job execution additional time dt21, for the resolution smaller than 400 dpi, the scan job execution additional time dt21 for that case is "zero seconds".

The print job execution additional time dt22 is classified into levels based on a size and type of print data for a print job, and a length of time is preset in each of the levels. The specific examples of the print job execution additional time dt22 are as follows: The value "20 seconds" is preset for the print data having a size equal to or greater than 10 MB (Mega Bytes) in total; and the value "20 seconds" is preset for the print data whose type is image data. Since no value is registered, as the print job execution additional time dt22, for the print data having a size smaller than 10 MB and for the print data whose type is different from image data, the print job execution additional time dt22 for these cases is "zero seconds" each.

Note that the case where the type of print data is image data includes: a case where print data contains parameters for high-resolution printing because a user designates a photo image print mode as a print mode; and a case where print data contains large-size data such as Joint Photographic Experts Group (JPEG) or Tagged Image File Format (TIFF). Printing based on such print data involves performing many processes for generating a bitmapped image. Thus, a print job in progress eventually imposes a large load on the image processing apparatus 1.

The FAX reception job execution additional time dt23 is classified into levels based on a size of received data for a FAX reception job and receivable sets of such data, and a length of time is preset in each of the levels. The specific examples of the FAX reception job execution additional time dt23 are as follows: The value "20 seconds" is preset for the received data having a size equal to or greater than 10 MB (Mega Bytes) in total; and the value "40 seconds" is preset for a case where at least two sets of received data are receivable at one time. Since no value is registered, as the FAX reception job execution additional time dt23, for the received data having a size smaller than 10 MB (Mega Bytes) in total and for a case where receivable sets of received data are smaller than 2 sets, the FAX reception job execution additional time dt23 for such cases is "zero seconds" each.

The time-out period determination table DT also contains a job standby additional time DT3 whose value is to be added to the value of the standard time-out period dt11 depending on a load due to a job in progress.

Referring to FIG. 5, the job standby additional time DT3 includes a scan job standby additional time dt31 for a scan job in queue, a print job standby additional time dt32 for a print job in queue, and a FAX reception job standby time dt33 for a FAX reception job in queue. The scan job standby additional time dt31, the print job standby additional time dt32, and the FAX reception job standby additional time dt33 are assigned values individually.

The scan job standby additional time dt31, the print job standby additional time dt32, and the FAX reception job standby additional time dt33 are classified into levels as with the case of the scan job execution additional time dt21, the print job execution additional time dt22, and the FAX reception job execution additional time dt23, respectively. The scan job standby additional time dt31, the print job standby additional time dt32, and the FAX reception job standby additional time dt33 are assigned values individually.

The system control unit 11 decides a time-out period ET in a manner as shown in FIG. 7, and informs the Web browser 13 of the time-out period ET thus decided.

To be specific, the system control unit 11 determines whether or not a Web server requested to send a Web page is the Web server 14 of the image processing apparatus 1 (Step S301). The determination is made based on, for example, an URL of the requested Web page.

If the Web server requested to send a Web page is different from the Web server 14 of the image processing apparatus 1 (No in Step S301), then the standard time-out period dt11 registered in the time-out period determination table DT is regarded as the time-out period ET (Step S302).

On the other hand, if the Web server requested to send a Web page is the Web server 14 of the image processing apparatus 1 (Yes in Step S301), then the system control unit 11 determines whether or not the job list JL contains jobs therein (Step S303).

If the job list JL contains no jobs (No in Step S303), then the standard time-out period dt11 registered in the time-out period determination table DT is regarded as the time-out period ET (Step S302).

If the job list JL contains jobs (Yes in Step S303), then the system control unit 11 determines whether or not the jobs include a job in progress (Step S304). The determination is made by checking whether or not the job list JL contains a job having a value indicative of being executed in the execution state JL4, i.e., the value "RUN" in the example of FIGS. 4A to 4C.

If the job list JL contains a job in progress (Yes in Step S304), then the system control unit 11 checks the details of the job against the details of the job execution additional time DT2 registered in the time-out period determination table DT, thereby to calculate a total additional time AT1 based on job in progress (Step S305). If the job list JL contains a plurality of jobs in progress, then values of the job execution additional time DT2 corresponding to the individual jobs are added together, and the resultant is regarded as the total additional time AT1. If the job list JL contains no jobs in progress (No in Step S304), then the total additional time AT1 is determined to be "zero seconds" (Step S306).

In the example of FIG. 4A, the job list JL contains a scan job as a job in progress. Accordingly, the system control unit 11 determines whether or not the details of the scan job correspond to any of the details registered as the job execution additional time DT2 based on the setting details of the job detailed information JL3 of the scan job, and calculates the total additional time AT1 based on job in progress. When the scan job involves scanning a document image at a resolution of 500 dpi, for example, the total additional time AT1 based on job in progress is determined to be "40 seconds".

In the example of FIG. 4B, the job list JL contains, as a job in progress, a scan job having a value of "1" in the registration number JL1. Accordingly, the total additional time AT1 based on job in progress is calculated as with the case of FIG. 4A.

In the example of FIG. 4C, the job list JL contains, as jobs in progress, a scan job and a print job having values of "1" and "2" respectively in the registration number JL1. Accordingly, the system control unit 11 determines whether or not the details of each of the scan job and the print job correspond to any of the details registered as the job execution additional time DT2 based on the setting details of the job detailed information JL3 of each of the jobs, and calculates the total additional time AT1 based on job in progress. When the job having a value of "1" in the registration number JL1 is a scan job involving scanning a document image at a resolution of 500 dpi, and the job having a value of "2" in the registration number JL1 is a print job involving print data whose total size is 20 MB, the total additional time AT1 based on job in progress is determined to be "60 seconds (40 seconds+20 seconds)".

If the job list JL contains jobs (Yes in Step S303), then the system control unit 11 determines whether or not the jobs include a job in queue (Step S307). The determination is made by checking whether or not the job list JL contains a job having a value indicative of being standby state in the execution state JL4, i.e., the value "READY" in the example of FIGS. 4B and 4C.

If the job list JL contains a job in queue (Yes in Step S307), then the system control unit 11 checks the details of the job against the details of the job standby additional time DT3 registered in the time-out period determination table DT, thereby to calculate a total additional time AT2 based on job in queue (Step S308). If the job list JL contains a plurality of jobs in queue, then values of the job standby additional time DT3 corresponding to the individual jobs are added together, and the resultant is regarded as the total additional time AT2. If the job list JL contains no jobs in queue (No in Step S307), then the total additional time AT2 is determined to be "zero seconds" (Step S309).

In the example of FIG. 4A, since the job list JL contains no jobs in queue, the total additional time AT2 based on job in queue is determined to be "zero seconds".

In the example of FIG. 4B, the job list JL contains, as a job in queue, a print job having a value of "2" in the registration number JL1. Accordingly, the system control unit 11 determines whether or not the details of the print job correspond to any of the details registered as the job standby additional time DT3 based on the setting details of the job detailed information JL3 of the print job, and calculates the total additional time AT2 based on job in queue. When the print job involves print data whose size is 20 MB in total, for example, the total additional time AT2 based on job in queue is determined to be "20 seconds".

In the example of FIG. 4C, the job list JL contains, as jobs in queue, a FAX reception job, a scan job, and a print job having values of "3" to "5" respectively in the registration number JL1. Accordingly, the system control unit 11 determines whether or not the details of each of the FAX reception job, the scan job, and the print job correspond to any of the details registered as the job standby additional time DT3 based on the setting details of the job detailed information JL3 of each of the jobs, and calculates the total additional time AT2 based on job in queue. When the job having a value of "3" in the registration number JL1 is a FAX reception job involving received data having a total size of 20 MB, the job having a value of "4" therein is a scan job involving scanning a document image at a resolution of 500 dpi, and the job having a value of "5" therein is a print job involving print data having a total size of 20 MB, the total additional time AT2 based on job in queue is determined to be "80 seconds (20 seconds+40 seconds+20 seconds)".

After the calculation of the total additional time AT1 based on job in progress and the total additional time AT2 based on job in queue, the system control unit 11 adds the total additional time AT1 and the total additional time AT2 to the standard time-out period dt11 registered in the time-out period determination table DT, and determines the resultant to be the time-out period ET (Step S310).

The system control unit 11, then, checks whether or not the time-out period ET thus determined is longer than the allowable time-out period dt12 registered in the time-out period determination table DT (Step S311). If the time-out period ET is longer than the allowable time-out period dt12 (Yes in Step S311), then the system control unit 11 cancels the determination in Step S310 and regards the allowable time-out period dt12 as the time-out period ET (Step S312).

Referring back to FIG. 6, when the system control unit 11 determines the time-out period ET in the manner as shown in FIG. 7 (Step S201), the Web browser 13 requests the Web server 14 or an external server (e.g., a Web server provided in the Web server machine 2) to provide a Web page relating to the instruction from the UI management portion 12 (Step S202). After making the request, the Web browser 13 waits for a response from the Web server 14 or the external server until the time-out period ET has elapsed since the request was made. If the Web browser 13 receives a response before the lapse of the time-out period ET (Yes in Step S203), then the display device 10d is caused to display the details of the Web page provided by the Web server 14 or the external server (Step S204). On the other hand, if the Web browser 13 receives no response before the lapse of the time-out period ET (No in Step S203), then the display device 10d is caused to display the details of a Web page that is prepared in advance by the Web browser 13 and is to inform a user of a time-out error (Step S205).

The Web server 14 provides a Web page prepared in advance in response to a request from the Web browser 13 and the external Web browser. The Web server 14 provides, if necessary, a Web page dynamically created based on a result obtained by executing a program managed by the CGI management portion 15.

The CGI management portion 15 manages a program executed for a case where the Web server 14 dynamically creates the web page.

As discussed above, in this embodiment, a time-out period ET of the Web browser 13 is determined taking account of load conditions associated with job execution, such as the number of jobs in progress and jobs in queue in the image processing apparatus 1, job type, job execution mode, the size of data for a job. Thus, the time-out period ET of the Web browser 13 has an appropriate length of time depending on conditions of the load imposed on the entire image processing apparatus 1, so that a good user interface is provided.

The following arrangement is discussed in the foregoing embodiment. If the determined time-out period ET is longer than the allowable time-out period dt12 (Yes in Step S311), then the system control unit 11 cancels the determination and regards the allowable time-out period dt12 as the time-out period ET (Step S312). The Web browser 13, then, requests a Web page from the Web server 14, and waits for a response therefrom until the allowable time-out period dt12 has passed (Step S203). Instead of this, however, the arrangement shown in FIG. 8 is possible.

To be specific, the system control unit 11 calculates a time-out period ET in a manner shown in Step S301 through Step S310 of FIG. 7 (Step S401). If the time-out period ET thus calculated is longer than the allowable time-out period dt12 (Yes in Step S402), then the system control unit 11 instructs the Web browser 13 to stop requesting a Web page from the Web server 14. In accordance with the instructions, the Web browser 13 stops requesting a Web page from the Web server 14 and causes the display device 10d to display (Step S406) the details of a Web page for informing a user of an error.

According to the embodiment discussed above, the time-out period determination table DT contains, as the job execution additional time DT2 and the job execution additional time DT3, additional time each for a scan job, a print job, and a FAX reception job. The time-out period determination table DT may further contain additional time for another job. For example, the time-out period determination table DT may contain job execution additional time DT2 for a copy job and job execution additional time DT3 for a copy job.

In the embodiment discussed above, the system control unit 11 calculates the total additional time AT1 based on job in progress, and the total additional time AT2 based on job in queue, and adds the total additional time AT1 and the job execution additional time DT2 to the standard time-out period dt11, thereby to determine the time-out period ET, independently of the priority of tasks corresponding to the Web server 14. Instead of this, however, the system control unit 11 may perform those processes taking account of the priority of tasks corresponding to the Web server 14. For example, the system control unit 11 may be configured to perform those processes only when the priority of tasks corresponding to the Web server 14 is lower than the priority of tasks corresponding to the job processing portion 17.

The determination method of the time-out period ET, which is described earlier, is applicable to the case where the Web server 14 is requested to provide a Web page not only from the Web browser 13 of the image processing apparatus 1 but also from an external Web browser (e.g., a Web browser of the user terminal 3). In such a case, the image processing apparatus 1 informs the external Web browser of the determined time-out period ET.

In the embodiments discussed above, the hardware configuration and the functional configuration of the image processing apparatus 1, and the like may be altered as required in accordance with the subject matter of the present invention. Further, the content to be processed, the processing sequence, and the like of the image processing apparatus 1 may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
   an execution portion configured to execute a job;
   a providing portion configured to provide a Web page in response to a request from a request source;
   a determination portion configured to determine a time-out period depending on conditions of a job that is being executed by the execution portion and conditions of a job that waits to be executed by the execution portion, the time-out period being a period during which a response from the providing portion to the request is acceptable; and
   a management portion configured to manage execution of a process by the execution portion and a process by the providing portion in such a manner that the process by the execution portion is executed before the process by the providing portion.

2. The image processing apparatus according to claim 1, wherein the determination portion determines that the time-out period is a sum of standard time and additional time, the standard time being time having a standard length as the time-out period, the additional time being time to be added to the standard time depending on the conditions of the job that is being executed by the execution portion and the conditions of the job that waits to be executed by the execution portion.

3. The image processing apparatus according to claim 2, wherein the determination portion determines the time-out period in such a manner that the time-out period is shorter than an allowable period of time having a maximum length allowable as the time-out period.

4. The image processing apparatus according to claim 2, wherein, if the time-out period calculated by the determination portion is longer than an allowable period of time having a maximum length allowable as the time-out period, the request source of the request stops requesting the Web page from the providing portion.

5. A method for controlling an image processing apparatus, the image processing apparatus including an execution portion configured to execute a job, and a providing portion configured to provide a Web page in response to a request from a request source, the method causing the image processing apparatus to perform processes comprising:
   a first process for determining a time-out period depending on conditions of a job that is being executed by the execution portion and conditions of a job that waits to be executed by the execution portion, the time-out period being a period during which a response from the providing portion to the request is acceptable; and
   a second process for managing execution of a process by the execution portion and a process by the providing portion in such a manner that the process by the execution portion is executed before the process by the providing portion.

6. The method according to claim 5, wherein the first process includes determining that the time-out period is a sum of standard time and additional time, the standard time being time having a standard length as the time-out period, the additional time being time to be added to the standard time depending on the conditions of the job that is being executed by the execution portion and the conditions of the job that waits to be executed by the execution portion.

7. The method according to claim 6, wherein the first process includes determining the time-out period in such a manner that the time-out period is shorter than an allowable period of time having a maximum length allowable as the time-out period.

8. The method according to claim 6, wherein, if the time-out period calculated by the determination portion is longer than an allowable period of time having a maximum length allowable as the time-out period, the request source of the request stops requesting the Web page from the providing portion.

9. A non-transitory computer-readable storage medium storing thereon a computer program used for controlling an image processing apparatus, the image processing apparatus including an execution portion configured to execute a job, and a providing portion configured to provide a Web page in response to a request from a request source, the computer program causing the image processing apparatus to implement processes comprising:
   a first process for determining a time-out period depending on conditions of a job that is being executed by the execution portion and conditions of a job that waits to be executed by the execution portion, the time-out period being a period during which a response from the providing portion to the request is acceptable; and
   a second process for managing execution of a process by the execution portion and a process by the providing portion in such a manner that the process by the execution portion is executed before the process by the providing portion.

10. The non-transitory computer-readable storage medium according to claim 9, wherein the first process includes determining that the time-out period is a sum of standard time and additional time, the standard time being time having a standard length as the time-out period, the additional time being time to be added to the standard time depending on the conditions of the job that is being executed by the execution portion and the conditions of the job that waits to be executed by the execution portion.

11. The non-transitory computer-readable storage medium according to claim 10, wherein the first process includes determining the time-out period in such a manner that the time-out period is shorter than an allowable period of time having a maximum length allowable as the time-out period.

12. The non-transitory computer-readable storage medium according to claim 10, wherein, if the time-out period calculated by the determination portion is longer than an allowable period of time having a maximum length allowable as the time-out period, the request source of the request stops requesting the Web page from the providing portion.

* * * * *